United States Patent Office 3,192,188
Patented June 29, 1965

3,192,188
VARNISH RESINS CONSISTING OF CHLORINATED POLYPROPYLENE OR CHLORINATED COPOLYMERS OF ETHYLENE AND PROPYLENE AND PROCESS FOR THEIR MANUFACTURE
Ludwig Orthner, Frankfurt am Main, and Helmut Klug and Hans Georg Kolm, Gersthofen, near Augsburg, and Horst Herzberg, Frankfurt am Main, Germany, assignors to Farbwerke Hoechst Aktiengesellschaft vormals Meister Lucius & Brüning, Frankfurt am Main, Germany, a corporation of Germany
No Drawing. Filed Aug. 21, 1959, Ser. No. 835,196
Claims priority, application Germany, Aug. 23, 1958, F 26,474
1 Claim. (Cl. 260—88.2)

The present invention relates to varnish resins consisting of chlorinated polypropylene or chlorinated copolymers of ethylene and propylene and a process for their manufacture.

We have found that isotactic polypropylenes and copolymers of ethylene and propylene, the latter containing advantageously at least 10% of chemically bound propylene, can be chlorinated in an economical way at a temperature below 110 to 115° C., advantageously not below 40° C., in a heterogeneous manner in the form of a suspension in low-boiling halogenated hydrocarbons which are inert under the reaction conditions, for example bromotrichloromethane, tetrachlorethane and fluorochlorethanes, advantageously carbon tetrachloride, and after absorption of at least 25% by weight, for example more than 35% by weight, or advantageously more than 45% by weight of chlorine, yield clear solutions of varnish resins which possess excellent properties and yield completely clear films of excellent mechanical properties. It has hitherto not been possible to produce varnish resins of such good properties on the basis of chlorination products of polyolefins. There may also be used solvents which are not completely inert, for example methylene chloride, chloroform, trichlorethane, tetrachlorethylene or trichlorethylene, if the reaction products of these substances do not affect the quality of the chlorinated polymers or can be easily removed therefrom. The possibility of avoiding higher temperatures in each stage of the chlorination permits to proceed without the application of pressure and consequently essentially facilitates working and furthermore reduces the tendency of chlorinated polypropylenes to discolor. Polymers which are most interesting from a technical point of view are those having $\eta$ red. values of 3 to 20; products of lower or higher $\eta$ red. values may, however, also be used if desired. The $\eta$ red. value is determined in an Ostwald viscosimeter in a 0.1% solution of the polymer in decahydronaphthalene at 135° C. and calculated according to the equation $$\eta \text{ red.} = \frac{1}{c} \cdot \frac{\eta - \eta_0}{\eta_0}$$

wherein
$\eta$ is the viscosity of the solution,
$\eta_0$ is the viscosity of the solvent and
$c$ is the concentration of the solution in percent.

This reduced viscosity is much more valuable for characterizing low pressure polyethylenes than for characterizing high pressure polyethylenes (cf. Angewandte Chemie, 67,548 (1955); Harro Hagen, "Polyäthylen und andere Polyolefine," pages 15, 50, published by Brunke Garrels, Hamburg, 1st edition, 1958).

In a preferred form of the process of the invention, polypropylene and/or copolymers of propylene and ethylene are suspended in carbon tetrachloride, and gaseous chlorine is introduced while mixing thoroughly at reflux temperature. It is also possible to carry out the chlorination under an elevated pressure, but care has to be taken that the temperature is kept below 115° C. The polypropylene and the aforesaid copolymers are gradually dissolved as the chlorination proceeds. When the polymers have been chlorinated to a chlorine content of 25 to 40%, the suspension is converted into a clear solution.

The chlorination can be carried out in a particularly advantageous and economical manner by prechlorinating the aforesaid polymers in the absence of organic dispersing agents in a heterogeneous phase, preferably in the presence of water or an electrolyte solution, to a chlorine content up to 65%, advantageously at least 20% and preferably 35 to 50%, at a temperature of 20 to 160° C., advantageously 80 to 90° C., but in any case at a temperature below the softening point of the polymer. The chlorination products so obtained which are in most cases insoluble or can be swelled to a slight degree or which, under certain circumstances, may be soluble, are then aftertreated with gaseous chlorine according to the process of the invention as described above until a chlorine content of 25 to 65% has been reached. Products containing 45 to 60% of chlorine are particularly valuable. It is, however, also possible to chlorinate the products to a higher degree if this is desired in view of the end use of the products. If desired, polypropylenes or copolymers of ethylene and propylene may be used which have been prechlorinated in a different manner, for example in a manner analogous to that applied in the processes for the chlorination of polyethylene.

In the process of the invention a dispersion is used having a solid content of, for example, 2 to 5%, advantageously 10 to 25%, it is however, also possible to use higher concentrations, especially if the products have been prechlorinated to a higher chlorine content.

Both forms of the chlorination may be modified to a large extent with regard to the mode of accelerating the reaction; the reaction may be accelerated, for example, by treatment with ultraviolet rays, by working under superatmospheric pressure or by adding a peroxide or another radical-forming substance. Also, the process of the invention may be conducted continuously according to known methods and the end products may be worked up in known manner. As stabilizers there may be used, for example, amines, carbamides such as urea and the substitution products thereof, epoxide compounds of low molecular or high molecular weight such as phenoxypropene oxide, polymerization products of diphenylol-propane-diglycidyl ether, tin stabilizers such as dialkyl, trialkyl, diacyl and triacyl tin compounds, for example laurates. The chlorination products may be freed from the solvent by spraying, if necessary after filtration with inorganic auxiliary filtering agents such as kieselguhr. When it is desired to introduce the chlorination products into other solvents, for example those usually applied in the lacquer and varnish industry, drying may be avoided by distilling off the solvent used in the chlorination and successively introducing another solvent of higher boiling point; for this purpose xylene, toluene, butyl acetate or cyclohexanone may, for example, be used.

The colorless clear solutions so obtained constitute—if necessary after the addition of a substance commonly used as a softener, for example tricresyl phosphate, dibutyl phthalate, dioctyl phthalate, paraffinsulfonic acid cresyl ester or chlorinated paraffin—excellent varnish resins, i.e., binding components for coatings or paints of high luster which are flameproof, water-repellent, resistant to acids and alkalies, i.e., corrosion-resistant and free from pores, and of which the mechanical properties can be adapted to the requirements in a given case by varying the chlorine content. On drying, the varnish solutions rapidly give off the solvent and the coat or paint adheres well even to smooth metal surfaces. Owing to the aforesaid properties, the products obtained by the process of the invention may also be widely used for impregnating paper and tissue and for coating other bodies of high molecular weight. They also find practical use as compact material, for example in the form of pressed plates.

The following examples serve to illustrate the invention but they are not intended to limit it thereto.

Example 1

A current of 25 grams of chlorine per hour was introduced while stirring vigorously into a suspension of 800 grams of crystalline polypropylene of $\eta$ red. 8.0 in 4 liters of water at 80 to 85° C. After 23 hours, the chlorine content amounted to 25.2%. 1070 grams of chlorinated polypropylene were obtained. The white, externally unchanged powder was suction-filtered, suspended, while being still moist, in 8 liters of carbon tetrachloride and after heating to reflux temperature, 47 grams of gaseous chlorine per hour were introduced for another 23 hours while stirring. The solution which was then only slightly turbid was cooled by blowing with air, stirred with 30 grams of kieselguhr, filtered and the filtrate was sprayed into a 30-liter bulb preheated to 35° C. and containing 15 liters of methanol. The very fine flakes accumulating in the methanol were continuously drawn off and dried at 80° C. The chlorine content amounted to 51.9% and the yield was 1630 grams. The product was very easily soluble in esters and aromatic or halogenated aliphatic hydrocarbons and yielded a clear solution. A 20% solution of the product in toluene had a viscosity of 70 centipoises at 20° C. so that the resulting varnish solutions could still be sprayed at a solid content of 15% and were still brushable at a solid content of 25%. The varnish solutions were well compatible with chlorinated rubber, chlorinated paraffin, alkyd resins, copolymers of vinyl chloride/vinyl isobutyl ether and linseed stand oil. The unblended varnish film had a tensile strength of 156 kg./cm.$^2$ and an elongation at break of 24%.

Example 2

A current of 28 grams per hour of gaseous chlorine was introduced while stirring into a suspension of 800 grams of crystalline polypropylene of $\eta$ red. 8.0 in water at 80 to 85° C. After 50 hours, the chlorine content amounted to 45.6%. The yield was 1430 grams. The product was suction-filtered and suspended, while being still moist, in 7 liters of carbon tetrachloride. A total of 720 grams of chlorine was introduced at reflux temperature within 2 hours and 10 minutes while stirring vigorously. The solution was then cooled by blowing with air and after filtration with 40 grams of kieselguhr the clear solution was sprayed into a 30-liter bulb containing 10 liters of gasoline of 60° C. (boiling point 110 to 140° C.). The corresponding suspension of chlorinated polypropylene and gasoline was passed through a filter and the filtrate was recycled to the bulb. After drying at 80° C. under a pressure of 40 millimeters of mercury, the filter residue yielded a powder which was as fine as dust and very soluble in butyl acetate and aromatic or halogenated aliphatic hydrocarbons. The product had a chlorine content of 53.8%.

The product had a viscosity in the dissolved state of 36 centipoises, measured in a 20% toluene solution at 20° C. When only 2 to 5% of the toluene was replaced by a low-boiling aliphatic alcohol in admixture with butyl acetate or another ester, the viscosity dropped to 20 to 25 centipoises.

The solutions yielded coats of excellent filling properties. A varnish of 120 grams toluene
70 grams butyl acetate
10 grams ethyl alcohol
5 grams butyl alcohol
60 grams chlorinated polypropylene
60 grams chlorinated paraffin (70% Cl)
120 grams titanium dioxide yielded coats of high luster and very good adhesive properties as can be seen from the following values—grate cutting test according to DIN Specification No. 53151: unobjectionable; mandrel bending test 10 mm. according to DIN Specification No. 53152: 180° unobjectionable; deep-drawing test according to Erichsen DIN Specification No. 53156: sheet breaks.

Example 3

430 grams of gaseous chlorine were introduced while stirring within 8 hours at reflux temperature into a suspension of 150 grams of polypropylene of $\eta$ red 8.0 in 2 liters of carbon tetrachloride. After about two thirds of the indicated amount of chlorine had been absorbed, the solution began to become clear. The final chlorine content amounted to 58.5%. The solution was cooled by blowing with air in order to remove the hydrochloric acid, filtered with kieselguhr and sprayed on to 10 liters of a gasoline fraction of 70° C. (boiling point 200 to 225° C.) having as small a content of aromatic hydrocarbons as possible. The isolation and drying were carried out as described above. A white flocculent powder was obtained which was easily soluble in esters and aromatic or halogenated aliphatic hydrocarbons and yielded transparent hard coats of high luster which were resistant to scratching as well as to acetone, alcohol and gasoline. A 20% solution of the product in toluene had a viscosity of 26 centipoises at 20° C.

Example 4

In the course of 22 hours, 475 grams of gaseous chlorine were introduced into a suspension of 150 grams of crystalline polypropylene of $\eta$ red. 16.6 in 2 liters of carbon tetrachloride. The almost clear solution so obtained was cooled by blowing with air, filtered with kieselguhr and sprayed on gasoline as described above. After drying, the chlorinated polypropylene was obtained in the form of fine flakes. The product had a chlorine content of 61% and yielded clear solutions when dissolved in esters, and aromatic or halogenated aliphated hydrocarbons. The varnish films prepared therefrom were very hard. The elasticity could still be increased by the addition of a softener such as chlorinated paraffin, dioctyl phthalate, tricresyl phosphate, etc.

Example 5

250 grams of a copolymer of ethylene and propylene of $\eta$ red. 3.0 containing about 10% of chemically bound propylene were suspended in 2 liters of water and within 8 hours 295 grams of chlorine were introduced at 50 to 60° C. while stirring. The product so obtained was filtered off, introduced into 2.5 liters of carbon tetrachloride and treated while stirring at reflux temperature within 11 hours with 260 grams of gaseous chlorine. The solution which had become clear was filtered as described above and dried. The chlorine content amounted to 61.9%. The finely flocculent product was soluble as described above and the solutions obtained yielded clear tough varnish films.

For the preparation of varnishes on this basis no softener is necessary. On the contrary, owing to their good compatibility the products of this example may be used, under certain circumstances, as components of softening action for highly chlorinated rubber (68 to 70% Cl). This is demonstrated by the following comparison tests carried out with films of a pure chlorinated rubber varnish (68% Cl) (A), films of a varnish containing only a chlorination product prepared as described in Example 5 (B), and films of a varnish (C) of the following composition:

150 grams toluene
70 grams butyl acetate
60 grams chlorinated polypropylene
60 grams chlorinated rubber
0.3 gram dibutyl tin dilaurate.

|   | Tensile strength, kg./cm.$^2$ | Elongation at break (100 mm./min.), percent |
|---|---|---|
| (1) A | 36 | 6 |
| (2) B | 340 | 7.5 |
| (3) C | 280 | 9.5 |

*Example 6*

250 grams of a crystalline copolymer of ethylene and propylene of $\eta$ red. 2.04 containing 17% of chemically bound propylene which had been freed from low molecular weight portions soluble in gasoline of up to 50° C. were suspended in 2.5 liters of a 50% calcium chloride solution and chlorinated at 117° C. to a chlorine content of 40% by introducing chlorine gas. The resulting transparent agglomerates having the size of a pea were freed, after filtration, from adhering calcium chloride by means of warm water, introduced into 5 liters of a carbon tetrachloride and further chlorinated under slight superatmospheric pressure (3 m. of water column) at reflux temperature until the chlorination product contained 68% of chemically bound chlorine; the product was subsequently precipitated with methanol. The finely flocculent material yielded clear solutions when dissolved in esters, aromatic and chlorinated aliphatic hydrocarbons, methylethylketone and methoxybutyl acetate and the solutions so obtained yielded clear flexible coatings of good adhesion to wood and metal. Films prepared from the product of this example had a tensile strength of 300 kg./cm.$^2$ and an elongation at break of 9%. The product was particularly suitable for coating, for example, plastic films or paper. The permeability to water of paper which had been impregnated with a 5% solution of the product in trichlorethylene was reduced to a minimum.

Similar products were obtained from copolymers having $\eta$ red. values of less than 2.0.

Films prepared from the following composition:

150 grams toluene
70 grams butyl acetate
60 grams chlorinated copolymer prepared as described in Example 6
60 grams of chlorinated rubber (68% Cl)
0.3 gram dibutyl tin dilaurate possessed excellent properties as is evident from the following test results—grate cutting test DIN Specification No. 53151: unobjectionable; mandrel bending test DIN Specification No. 53152: 180°, unobjectionable; deep-drawing test according to Erichson DIN Specification No. 53156: 9.6 mm.

*Example 7*

250 grams of a copolymer of ethylene and propylene of $\eta$ red. 2.5 containing 10% of chemically bound propylene which had been freed from portions soluble in gasoline of up to 50° C. were suspended in 2.5 liters of water. Gaseous chlorine was introduced at 98° C. while stirring until the product had a chlorine content of 37.5%. The resulting white grains which were slightly rubber-elastic were filtered off, introduced into 4 liters of chlorethane and treated at 40° C. with gaseous chlorine until the chlorine content of the polymer was 67%. By precipitation with methanol, the chlorination product was obtained in the form of white flakes which, when dissolved in the solvents mentioned in Example 6, yielded clear, highly viscous and very stringy solutions. A film prepared therefrom had a tensile strength of 240 kg./cm.$^2$, i.e., a tensile strength which is far superior to that of films of other commercial products of the same type, for example a film of chlorinated rubber, which has a tensile strength of only 36 kg./cm.$^2$; the elongation at break of the product of this example was twice as high as that of the aforesaid film of chlorinated rubber.

Similar products were obtained by using tetrachloromethane instead of tetrachlorethane, the process being carried out under pressure in a closed system.

*Example 8*

3 kilograms of polypropylene ($\eta$ red. 8.3) were suspended in 225 liters of water and heated while stirring to 98 to 99° C. After the air had been removed from the gaseous phase, 4.9 kilograms of chlorine were introduced under pressure, whereby the working pressure first rose to 3.4 atmospheres (gage) and again reached its initial value after 1 hour. Stirring was continued for another hour and the product was then filtered off. The product so obtained contained 42% of chemically bound chlorine.

The sandy white powder obtained was suspended, while being still moist, in 50 liters of carbon tetrachloride and chlorine was introduced at reflux temperature with radiation with ultraviolet light until the product had a chlorine content of 54%. As source of radiation a mercury vapor dipping lamp of a power absorption of 90 watts was used which projected into the gaseous phase. When the chlorination was finished, the solution was filtered under pressure with 300 grams of kieselguhr and the chlorination product was then obtained in the state by one of the processes described above. The viscosity in the dissolved state measured in a 20% solution in toluene at 20° C. mounted to 51 centipoises. The tensile strength of the varnish films was 200 kg./cm.$^2$ and the elongation at break amounted to 6%. The varnish films possessed a good fastness to light. After 2 weeks of exposure to sunlight, no change could be detected in the films contrary, for example, to films of chlorinated rubber which after the same period showed rather strong signs of yellowing.

The films obtained from the product of this example were resistant to alcohols and gasoline; after 24 hours the films were still unaffected by acids and lyes whereas, for example, a copolymer of vinyl chloride and vinyl isobutyl ether which is also used in the field of coats and paints was strongly turbid after the same time.

A coat of varnish obtained from the following composition:

70 grams toluene
70 grams butyl acetate
60 grams chlorinated polypropylene
60 grams titanium dioxide
0.3 gram dibutyl tin dilaurate was almost unchanged after 15 months of weathering whereas a film of chlorinated rubber which had been prepared in an analogous manner exhibited an immense number of fine cracks.

Further examples of varnish compositions:

| Varnish composition | Grate cutting test DIN 53151 | Bending test DIN 53152 bending angle 180° | Erichsen test DIN 53156 |
|---|---|---|---|
| (1) 70 g. toluene<br>50 g. butyl acetate<br>80 g. chlorinated polypropylene<br>20 g. tricresyl phosphate<br>80 g. titanium dioxide<br>0.3 g. dibutyl tin dilaurate | Unobjectionable | Unobjectionable | Sheet breaks. |
| (2) 70 g. toluene<br>50 g. butyl acetate<br>60 g. chlorinated polypropylene<br>20 g. chlorinated diphenyl (56% Cl)<br>80 g. titanium dioxide<br>0.3 g. dibutyl tin dilaurate | Unobjectionable | Unobjectionable | Sheet breaks. |
| (3) 100 g. toluene<br>70 g. butyl acetate<br>60 g. chlorinated polypropylene<br>60 g. linseed stand oil<br>120 g. titanium dioxide | Unobjectionable | Unobjectionable | 9.8 mm. |

We claim:

A process for the production of soluble chlorinated polymers from insoluble polymers which comprises the step of prechlorinating with gaseous chlorine a member selected from the group of isotactic polypropylene and copolymers of propylene and ethylene consisting of at least 10% of propylene in a suspended form in a member selected from the group consisting of water, hydrogen chloride solution, and calcium chloride solution at a temperature within the range of 20° to 160° C. until a chlorine content of at least 20% by weight is reached, separating the prechlorinated polyolefin from said suspending media, and continuing the chlorination at a temperature within the range of 40° to 115° C., the separated prechlorinated products being suspended in a halogenated, aliphatic hydrocarbon having up to two carbon atoms.

References Cited by the Examiner

UNITED STATES PATENTS

| | | | |
|---|---|---|---|
| 2,213,331 | 9/40 | Arveson | 260—93.7 |
| 2,405,971 | 8/46 | McAlevy | 260—93.7 |
| 2,592,763 | 4/52 | Taylor | 260—94.9 |
| 2,879,261 | 3/59 | Johnson et al. | 260—88.2 |
| 2,906,743 | 9/59 | Heitzer et al. | 260—94.9 |
| 2,913,449 | 11/59 | Hoerger et al. | 260—94.9 |
| 2,926,159 | 2/60 | Tinsley | 260—88.2 |
| 3,022,276 | 2/62 | Orthner et al. | 260—94.9 |

FOREIGN PATENTS 538,782    12/55    Belgium.

JOSEPH L. SCHOFER, *Primary Examiner*.

L. H. GASTON, M. LIEBMAN, L. GOTTS, WILLIAM H. SHORT, *Examiners*.